(12) United States Patent
Semenov

(10) Patent No.: US 11,586,481 B2
(45) Date of Patent: Feb. 21, 2023

(54) OPTIMIZATION OF PARALLEL PROCESSING USING WATERFALL REPRESENTATIONS

(71) Applicant: eBay Inc., San Jose, CA (US)

(72) Inventor: Dmytro Semenov, San Jose, CA (US)

(73) Assignee: eBay Inc., San Jose, CA (US)

( * ) Notice: Subject to any disclaimer, the term of this patent is extended or adjusted under 35 U.S.C. 154(b) by 333 days.

(21) Appl. No.: 16/984,903

(22) Filed: Aug. 4, 2020

(65) Prior Publication Data

US 2021/0011783 A1    Jan. 14, 2021

Related U.S. Application Data

(63) Continuation of application No. 16/018,899, filed on Jun. 26, 2018, now Pat. No. 10,776,177, which is a continuation of application No. 15/088,606, filed on Apr. 1, 2016, now Pat. No. 10,055,263.

(51) Int. Cl.
*G06F 9/52* (2006.01)
*G06F 9/54* (2006.01)
*G06F 9/48* (2006.01)
*G06F 11/34* (2006.01)
*G06T 11/20* (2006.01)

(52) U.S. Cl.
CPC .............. *G06F 9/52* (2013.01); *G06F 9/4881* (2013.01); *G06F 9/542* (2013.01); *G06F 11/3447* (2013.01); *G06F 11/3452* (2013.01); *G06F 11/3466* (2013.01); *G06T 11/206* (2013.01)

(58) Field of Classification Search
CPC .......... G06F 9/52; G06F 9/4881; G06F 9/542; G06F 11/3447; G06F 11/3466; G06F 11/3452; G06T 11/206
See application file for complete search history.

(56) References Cited

U.S. PATENT DOCUMENTS

| | | | |
|---|---|---|---|
| 6,339,832 | B1 | 1/2002 | Bowman-Amuah |
| 10,055,263 | B2 * | 8/2018 | Semenov .............. G06F 9/4881 |
| 10,776,177 | B2 | 9/2020 | Semenov |
| 2002/0194393 | A1 | 12/2002 | Hrischuk et al. |

(Continued)

OTHER PUBLICATIONS

Applicant Initiated Interview Summary received for U.S. Appl. No. 15/088,606, dated Feb. 27, 2018, 3 Pages.

(Continued)

*Primary Examiner* — Kenneth Tang
(74) *Attorney, Agent, or Firm* — FIG. 1 Patents

(57) ABSTRACT

Event data for an application execution is accessed from a table of logged events, the event data comprising a sequence, a hierarchy, and a start time and duration for each event. Dependency data for each event is also accessed to determine whether the start time for an event is dependent on the prior completion of at least one other event. A waterfall representation is then generated, the representation including an entry for each event in the sequence, with a start time and duration represented for each event. Based on the dependencies and hierarchy, it is determined, for each event with a start time that is later than the start time of an event which precedes it in the sequence, whether the event's start time is dependent on the prior completion of at least one preceding event. The start time for each event may then be advanced based on the determination.

20 Claims, 8 Drawing Sheets

(56) References Cited

U.S. PATENT DOCUMENTS

| | | | |
|---|---|---|---|
| 2005/0097471 A1* | 5/2005 | Faraday | G06F 3/0486 |
| | | | 715/764 |
| 2005/0125794 A1 | 6/2005 | De Groot et al. | |
| 2009/0164439 A1* | 6/2009 | Nevins | G06F 16/2477 |
| 2009/0235225 A1 | 9/2009 | Killisperger et al. | |
| 2010/0305991 A1 | 12/2010 | Diao et al. | |
| 2011/0099500 A1* | 4/2011 | Smith | H04L 41/22 |
| | | | 715/771 |
| 2014/0006938 A1* | 1/2014 | Black | G06T 13/00 |
| | | | 715/255 |
| 2014/0053137 A1 | 2/2014 | Buehler et al. | |
| 2014/0278755 A1* | 9/2014 | Eberl | G06F 16/2228 |
| | | | 705/7.29 |
| 2014/0324710 A1 | 10/2014 | Thibout et al. | |
| 2015/0170382 A1 | 6/2015 | Bhatia | |
| 2015/0213631 A1* | 7/2015 | Vander Broek | G06F 16/2477 |
| | | | 345/589 |
| 2015/0262396 A1 | 9/2015 | Devarajan et al. | |
| 2015/0363249 A1 | 12/2015 | Mizobuchi et al. | |
| 2016/0267442 A1* | 9/2016 | Richardson | G06T 19/20 |
| 2016/0335583 A1 | 11/2016 | Suntinger et al. | |
| 2017/0286184 A1 | 10/2017 | Semenov | |
| 2018/0300183 A1 | 10/2018 | Semenov | |
| 2020/0192531 A1* | 6/2020 | Ryan | G06F 3/04845 |
| 2020/0201699 A1* | 6/2020 | Yu | G06F 11/0769 |

OTHER PUBLICATIONS

Non-Final Office Action received for U.S. Appl. No. 15/088,606, dated Jan. 25, 2018, 6 pages.

Notice of Allowance received for U.S. Appl. No. 15/088,606, dated Apr. 17, 2018, 8 pages.

Preliminary Amendment for U.S. Appl. No. 15/088,606, filed Apr. 28, 2016, 3 pages.

Response to Non-Final Office Action filed on Mar. 8, 2018, for U.S. Appl. No. 15/088,606, dated Jan. 25, 2018, 17 pages.

Applicant Initiated Interview Summary received for U.S. Appl. No. 16/018,899 dated May 8, 2020, 3 Pages.

Non Final Office Action received for U.S. Appl. No. 16/018,899, dated Feb. 6, 2020, 14 pages.

Notice of Allowance received for U.S. Appl. No. 16/018,899, dated May 14, 2020, 6 pages.

Response to Non-Final Office Action filed on May 5, 2020 for U.S. Appl. No. 16/018,899, dated Feb. 6, 2020, 14 Pages.

* cited by examiner

OPTIMIZATION OF PARALLEL PROCESSING USING WATERFALL REPRESENTATIONS

CLAIM OF PRIORITY

This Application is a continuation of U.S. application Ser. No. 16/018,899, filed Jun. 26, 2018, which is a continuation of U.S. application Ser. No. 15/088,606, filed Apr. 1, 2016, which is hereby incorporated by reference in its entirety.

TECHNICAL FIELD

The present application relates generally to the field of optimizing computing processes, and, in specific exemplary embodiments, to systems and methods for using waterfall representations to analyze computing processes and identify inefficiencies in order to make corresponding adjustments to optimize the processes.

BACKGROUND

Many applications include instrumentation, which refers to an ability to: monitor or measure the application's level of performance, diagnose errors or record information regarding the execution of the application. The instrumentation can consist of application code for monitoring specific components in a system, for example, the code may output logged measurements associated with the performance of a system component to a log repository. An event log is a file (e.g., a table) with entries for events taking place in the execution of an application, such as transactions between a server and users of the application. The entry for each of the transactions (or other application activities) logged in the file is referred to as an "event". An event log can include sequential entries for successive application activities as a series of nested events to indicate a hierarchy of events (e.g., an application activity that invokes another activity), with each entry describing a type, content, start time, end time, or other attribute of the application activities.

Event logs are important for understanding the activities of complex systems. However in complex client-server systems the number of transactions can be very large and it may be difficult to analyze the large volume of data in an event log for an execution of an application of such a system. For example, parallel processing of client-server transactions is often desired, however a failure to process application transactions in parallel (e.g., due to application misconfiguration or faulty application logic) can be difficult to detect from a simple examination of an event log for an execution of the application.

BRIEF DESCRIPTION OF DRAWINGS

Various ones of the appended drawings merely illustrate exemplary embodiments and should not be considered as limiting its scope.

DETAILED DESCRIPTION

Figure 1:
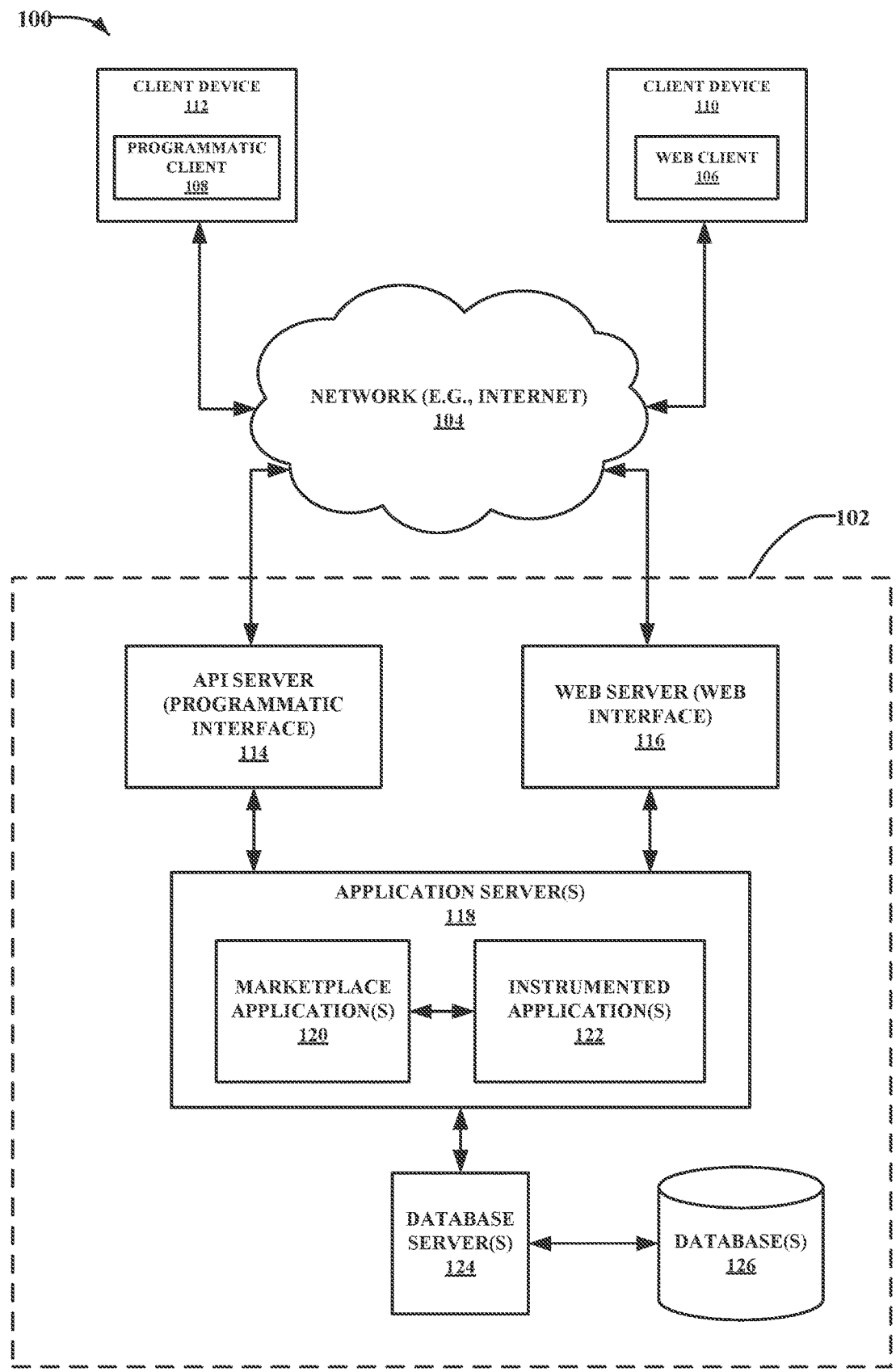
FIG. 1 is a network diagram depicting a network environment, according to one embodiment, having a client-server architecture configured for exchanging data, including an event log for an execution of an instrumented application, over a network.

In an embodiment, event data from an event log generated by an instrumented application (e.g., an electronic commerce "e-commerce" application) and stored in a central log repository is accessed. The event log can comprise a table of logged events in the execution of the application. The event data can describe a sequence and hierarchy of the events and include a start time and duration for each event (from which a completion time is also known). Dependency data for each event can also be accessed, for example from a database storing application related data (or via input from developer of the application). The dependency data indicates whether the start time for an application event is dependent on the prior completion of at least one other event of the application. A waterfall representation is generated based on the accessed event data, the representation comprising a data structure including an entry (e.g., field) for each event in the sequence along a first axis with fields for a start time and duration of each event measured relative to a second axis that is orthogonal to the first axis. The waterfall representation may be stored as a data structure for analysis as described below.

The waterfall representation can then be analyzed, based on the dependency data and event hierarchy to increase parallel processing by advancing the start time of identified application events. The analysis includes identifying each event that: has a start time that is later than a start time of an event which precedes it in the sequence and is not a child of an event which precedes it in the sequence. A child of an event that precedes it in the sequence is likely to represent an activity that has been invoked by an activity represented by the parent event and therefore its start time cannot be advanced independently of the parent event.

Each identified event is analyzed based on the dependency data to determine whether the start time for the event is dependent on a prior completion of at least one event that precedes it in the sequence. If the start time for the event is not dependent on a prior completion of at least one event that precedes it in the sequence, the start time for the event can be set to an earliest start time possible based on available parallel processing capacity. The earliest start time possible for an event can be determined, for example, based on a number of processing cores available at a server hosting the application or based on a maximum number of simultaneous connections per server of the application. Of course, a change to the event start time will also advance the start time of any child events of the event in the event hierarchy. If the start time for the event is dependent on a prior completion of at least one event that precedes it in the sequence, the start time for the event can be set to a latest completion time of the at least one event that precedes it in the sequence. For example, if an event's start time is dependent on three prior events in the sequence having been completed, then the event's start time can set to the latest of the completion times of the three prior events in the sequence.

In an embodiment, the start time of an event is only set to an earlier start time if this would help reduce the total processing time for all of the events in the sequence. In this regard, for each event in the sequence, a latest completion time of all the events that precede it in the sequence can be identified. Thereafter, even if an event can have its start time advanced (e.g., as described herein), the start time of the event will not be advanced (e.g., to avoid having to modify the application for no benefit) if the start time and duration of the event indicates that it will already be completed prior to the identified latest completion time of all the events that precede it in the sequence. Furthermore, a special "totaling event" entry can be added at the top of the first axis of the waterfall representation before the first event in the sequence. The totaling event helps to analyze the latest completion time of all of the events in the sequence. The totaling event has a start time equal to the first event in the sequence and a duration that corresponds to a completion time equal to the latest completion time of all the events in the sequence.

The modified waterfall representation data structure (e.g., with event start times advanced to increase parallel processing) can then be output for further analysis or for use in modifying the application that produced the event log. For example, the execution sequence of the application can be altered in order to advance the start times of the application activities according to the modified waterfall representation.

The description that follows includes illustrative systems, methods, techniques, instruction sequences, and computing machine program products that comprise the disclosed embodiments. In the following description, for purposes of explanation, numerous specific details are set forth in order to provide an understanding of various embodiments of the subject matter described herein. It will be evident, however, to those skilled in the art that embodiments of the subject matter described herein may be practiced without these specific details. Further, well-known instruction instances, protocols, structures and techniques have not been shown in detail.

As used herein, the term "or" may be construed in an inclusive or exclusive sense. Similarly, the term "exemplary" may be construed merely to mean an example of something or an exemplar and not necessarily a preferred means of accomplishing a goal. Additionally, although various exemplary embodiments discussed below focus on an existing online search engine in a business environment, the embodiments are merely given for clarity in disclosure. Thus, any type of online presence, for example a social network, is considered as being within the scope of the present disclosure.

System Architecture

FIG. 1 is a network diagram depicting a network environment 100, according to one embodiment, having a client-server architecture configured for exchanging data, including an event log for an execution of an instrumented application 122, over a network. For example, the network environment 100 may be a publication/publisher system where clients may communicate and exchange data within the network environment 100. The data may pertain to various functions (e.g., online item purchases) and aspects (e.g., managing content and/or scheduling deliveries of purchased items) associated with the network environment 100 and its users. Although illustrated herein as a client-server architecture, other embodiments may include other network architectures, such as peer-to-peer or distributed network environments.

A data exchange platform, in an example form of a at least one marketplace application 120 (e.g. eBay Inc. of San Jose, Calif.) and at least one instrumented application 122 (e.g., e-commerce website application), may provide server-side functionality, via a network 104 (e.g., the Internet) to one or more client devices. The one or more clients may include users (e.g., sellers and buyers) that utilize the network environment 100 and, more specifically, the marketplace application 120 and the instrumented application 122, to exchange data over the network 104. These transactions may include transmitting, receiving and processing data regarding content and users of the network environment 100. The data may include, but is not limited to, content and user data such as user profiles; user attributes; product and service reviews and information, such as pricing and descriptive data; product, service, manufacturer, and seller recommendations; product and service listings associated with sellers; auction bids; and transaction data, such as collection and payment, shipping transactions, shipping label purchases, and real time synchronization of financial journals, among others.

In various embodiments, the data exchanges within the network environment 100 may be dependent upon user-selected functions available through one or more client or user interfaces (UIs). The UIs may be associated with a client device, such as a client machine 110 (or 112) using a web client 106. The web client 106 may, for example, be in communication with the instrumented application 122 via a web server 116. The UIs may also be associated with the client machine 110 (or 112) using a programmatic client 108. The programmatic client 108 may, for example, be in communication with the marketplace application 120 via an application programming interface "API" server 114. It will be appreciated that in various embodiments, the client machines 110 and 112 (and any others) may be associated with a buyer, a seller, a proprietor, a third party electronic commerce platform, a payment service provider, a shipping service provider, or a financial institution system, each in communication with the networked system 102 and optionally with each other. The buyers, sellers and proprietors may be any one of individuals, merchants, or other service providers.

The API server 114 and a web server 116 are coupled to, and provide programmatic and web interfaces respectively to, one or more application servers 118. The application server(s) 118 hosts one or more marketplace applications 120 and instrumented applications 122. The application server(s) 118 is, in turn, shown to be coupled to one or more database servers 124 that facilitate access to one or more databases 126 which may include information such as user profiles (e.g., for buyers and sellers), map data, historical sales data, historical traffic data for websites, etc.

In one embodiment, the web server 116 and the API server 114 communicate and receive data pertaining to product listings and commercial transactions, among other things, via various user input tools. For example, the web server 116 may send and receive data to and from a toolbar or webpage on a browser application (e.g., web client 106) operating on a client machine (e.g., client machine 110 or 112). The API server 114 may send and receive data to and from an application (e.g., programmatic client 108) running on a client machine (e.g., client machine 110 or 112).

In one embodiment, the marketplace application 120 provides listings and price-setting mechanisms whereby a user (seller or buyer) may list or buy goods and/or services (e.g., for sale) published on the marketplace application 120. For example, on an electronic storefront published to the marketplace application 120 by an instrumented application 120 that also generates an event log for each execution of the electronic storefront and transmits the log to a central log repository in the one or more databases 126.

Figure 2:
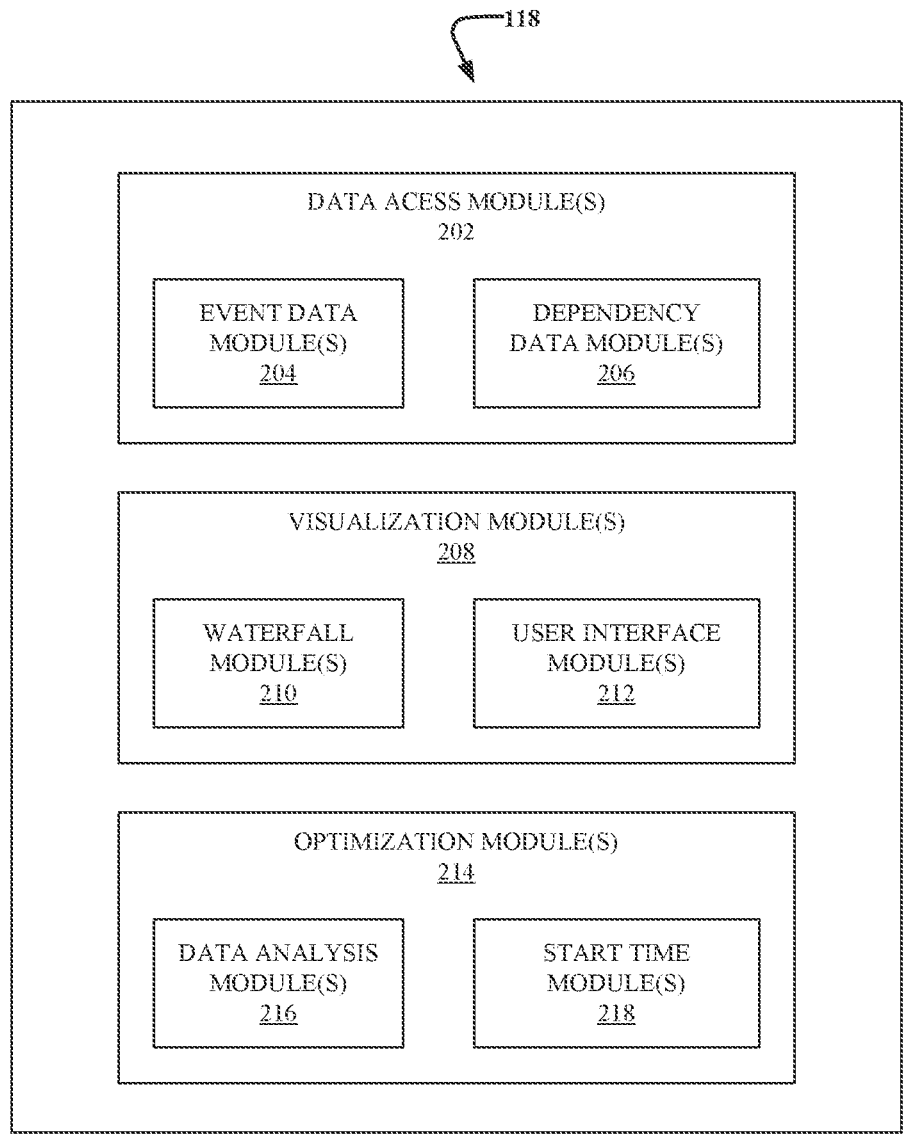
FIG. 2 shows a block diagram illustrating one example embodiment of an application server including modules for accessing data to generate a waterfall representation for analyzing computing processes and identifying inefficiencies in order to optimize the processes.

FIG. 2 shows a block diagram illustrating one example embodiment of an application server 118 including modules for accessing data to generate a waterfall representation for analyzing computing processes and identifying inefficiencies in order to optimize the processes. An application server 118 (as described above with respect to FIG. 1) can include one or more data access modules, representation modules and optimization modules In one embodiment, the application server 118 includes at least one data access module 202 for accessing data needed to generate and analyze a waterfall representation based on an event log. The data access module 202 includes at least one event data module 204 for accessing event data from an event log generated by an instrumented application 122 (e.g., an e-commerce website application) and stored in a central log repository in a database 126. As noted above, the event data can describe a sequence and hierarchy of the events and include a start time and duration for each event (or other attributes of each event).

The data access module 202 also includes at least one dependency data module 206 for accessing dependency data for each event, for example from a database 126 storing application related data. However, the dependency data may not exist in any database 126 and therefore the dependency data module 206 may obtain it via user input from a developer or other user with sufficient knowledge of the application 122. The dependency data indicates whether the start time for an event of an execution of application 122 is dependent on the prior completion of at least one other event of the application 122. For example, the event may require the output of a previous event as input.

In one embodiment, the application server 118 includes at least one representation module 208 for analyzing the data accessed by the data access module 202 and for generating a user interface for viewing an interacting with the analyzed data. The at least one representation module 208 includes at least one waterfall module 210 for generating a waterfall representation data structure based on the accessed event data. In an embodiment, the at least one waterfall module 210 generates a waterfall representation data structure including data for each event in the sequence as an entry along a first axis. The waterfall representation also includes data for a start time and duration of each event (with an entry on the first axis) measured relative to a second axis that is orthogonal to the first axis.

In one embodiment, the at least one representation module 208 includes at least one user interface module 212 for generating a user interface to be shown on the display of a device, such as a client device 110 or 112. The user interface can show a visualization of the waterfall representation and allow a user of the client device 110 or 112 (e.g., a developer of application 122) to view and interact with elements of the waterfall representation. For example, a developer of application 122 could input event dependency data via a user interface provided by the at least one user interface module 212 and the input event dependency data can then be accessed by the data access module 202 (via the dependency data module 206).

In one embodiment, the application server 118 includes at least one optimization module 214 for analyzing the waterfall representation based on the event dependency data and event hierarchy in order to increase parallel processing of application events by advancing the start time of the determined events. The at least one optimization module 214 can include at least one data analysis module 216 for identifying each event in the sequence that: has a start time that is later than a start time of an event which precedes it in the sequence and is not a child of an event which precedes it in the sequence. The child status of an event is determined because a goal of the optimization module 214 is to increase parallel processing of events by advancing the start time of the events. Therefore, an event which is a child of another event that precedes it in the sequence is not of interest since its start time cannot be advanced independently of the parent event that invokes it. However, the start time of the parent event may be advanced by the optimization module 214 leading to an earlier start time for the child event as well.

The at least one data analysis module 216 can then analyze each identified event based on the dependency data to determine whether the start time for the event is dependent on a prior completion of at least one event that precedes it in the sequence. If the data analysis module 216 determines that the start time for the event is not dependent on a prior completion of at least one event that precedes it in the sequence, then at least one start time module 218 (of the optimization module 214) can modify the start time for the event (in the waterfall representation) to an earliest start time possible. The earliest start time can be determined based on the available parallel processing capacity (e.g., of an application server 118) at the possible earlier start time.

The at least one start time module 218 may determine the earliest start time possible for an event by identifying a number of processing cores at a server 118 hosting the application 122 that are not being used at the possible earlier start time for the event. In the case of transaction events, the at least one start time module 218 may also determine the earliest start time possible for an event by identifying a maximum number of simultaneous connections per server 118 of the application 122. If the data analysis module 216 determines that the start time for the event is dependent on a prior completion of at least one event that precedes it in the sequence, the at least one start time module 218 may set the start time for the event (in the waterfall representation) to a latest completion time of the at least one event that precedes it in the sequence and must be completed before the event starts. The start time module 218 selects the latest completion time because this will ensure that the modified start time for each event in the waterfall representation does not precede the completion of any other event that must finish (e.g., provide an output) before the event can begin (e.g., accept prior output as input).

In an embodiment, the start time module 218 will only set the start time of an event to an earlier start time (e.g., as explained above) if this will help reduce the total processing time for all of the events in the sequence. The start time module 218 determines, for each event in the sequence, a latest completion time of all the events that precede it in the sequence. The start time module 218 take this latest completion time into account before advancing the start time of any event in the sequence. This is done in order to avoid suggesting a modification of the application 122 (based on the waterfall representation analysis) that does not reduce the overall processing time of all of the events in the sequence. For example, if the start time and duration of an event indicates that it will already be completed prior to the identified latest completion time of all the events that precede it in the sequence, then advancing the start time of the event will not reduce the overall processing time of all of the events in the sequence. In other words the event was not adding any time to the overall processing time of the sequence of events.

In an embodiment, the at least one waterfall module 210 can generate a the waterfall representation and include, a special "totaling event" (e.g., total time to render a webpage of an e-commerce website) entry at the top of the first axis of the waterfall representation, e.g., before the entry for the first event in the sequence. The waterfall module 210 can include the totaling event to keep track of the latest completion time of all of the events in the sequence so that any modifications to event start times can be tested to detect a reduction in the overall processing time of all of the events in the sequence. In order to do this the waterfall module 210 can include the totaling event with a start time equal to the first event in the sequence and a duration that results in a completion time for the totaling event that is equal to the latest completion time of all the events in the sequence.

Methods

Figure 3:
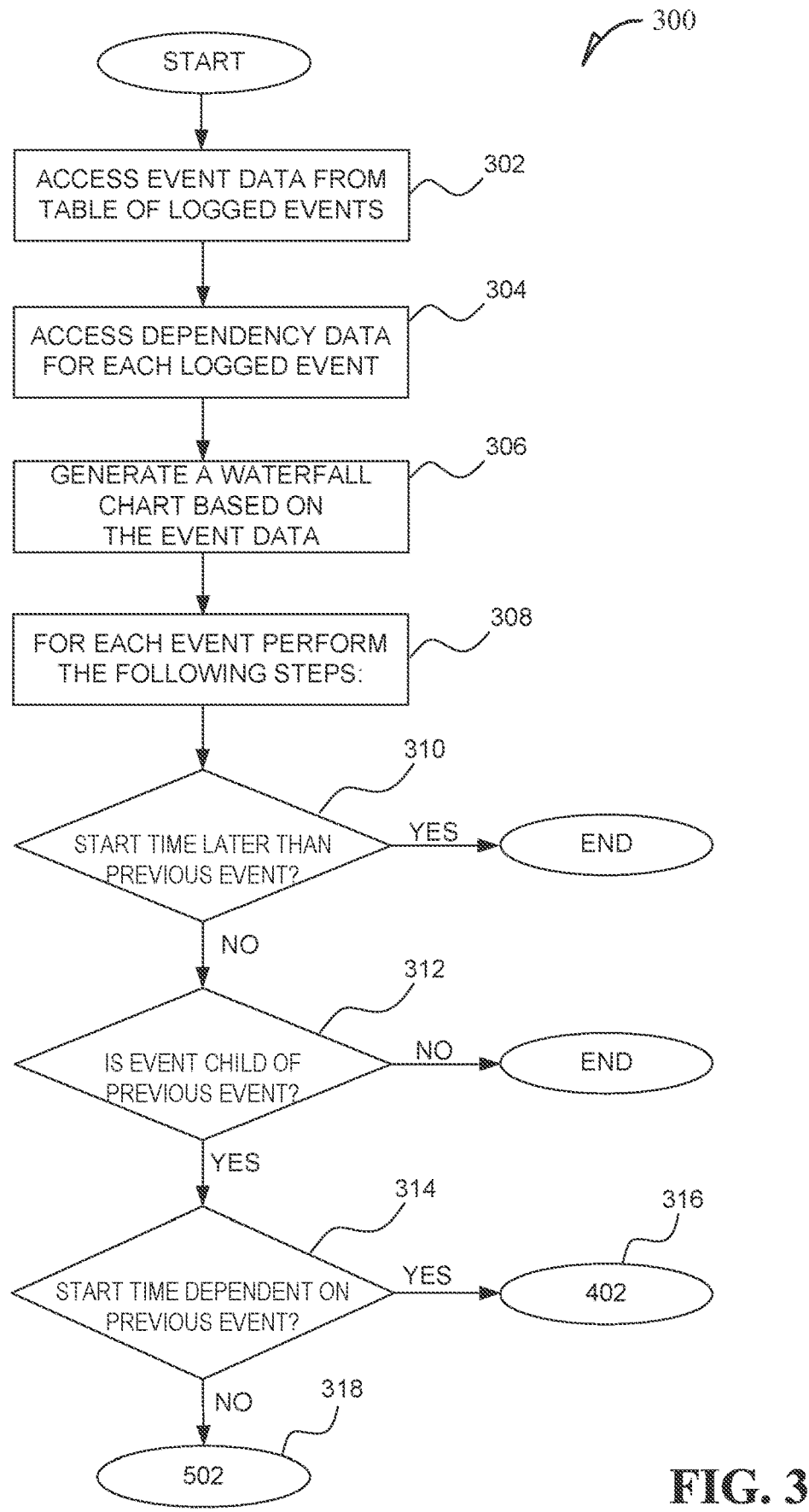
FIG. 3 shows a flow diagram illustrating one example embodiment of a method for using waterfall representations to analyze computing processes and identify inefficiencies in order to make corresponding adjustments to optimize the processes.

FIG. 3 shows a flow diagram illustrating one example embodiment of a method 300 for using waterfall representations to analyze computing processes and identify inefficiencies in order to make corresponding adjustments to optimize the processes. The operation of method 300 will be described with respect to the elements of FIGS. 1 and 2, and with respect to FIG. 6, which shows an example visualization of a waterfall representation 600 for analyzing computing processes and identifying inefficiencies in order to make corresponding adjustments to optimize the processes.

At operation 302, event data is accessed (e.g., by event data module 204) from an event log (e.g., a table of logged events) generated by an instrumented application (e.g., application 122) and stored in a central log repository (e.g., in a database 126). As noted above, the accessed event data can describe a sequence and hierarchy of the events of the event log and also include a start time and duration for each event (and/or other attributes of each event).

At operation 304, dependency data is accessed (e.g., by dependency data module 206) from a store of data (e.g., in a database 126) regarding instrumented application 122. As noted above, the dependency data may not exist in any database 126 and therefore it may be obtained from user input (via a user interface showing a visualization of a waterfall representation as described below) from a developer or other user with sufficient knowledge of the application 122. The accessed dependency data indicates whether the start time for an event of an execution of application 122 is dependent on the prior completion of at least one other event of the application 122. For example, a particular connection (e.g., to a server 118) may need to be established (e.g., connection event completed) before a transaction event can begin.

Figure 6:
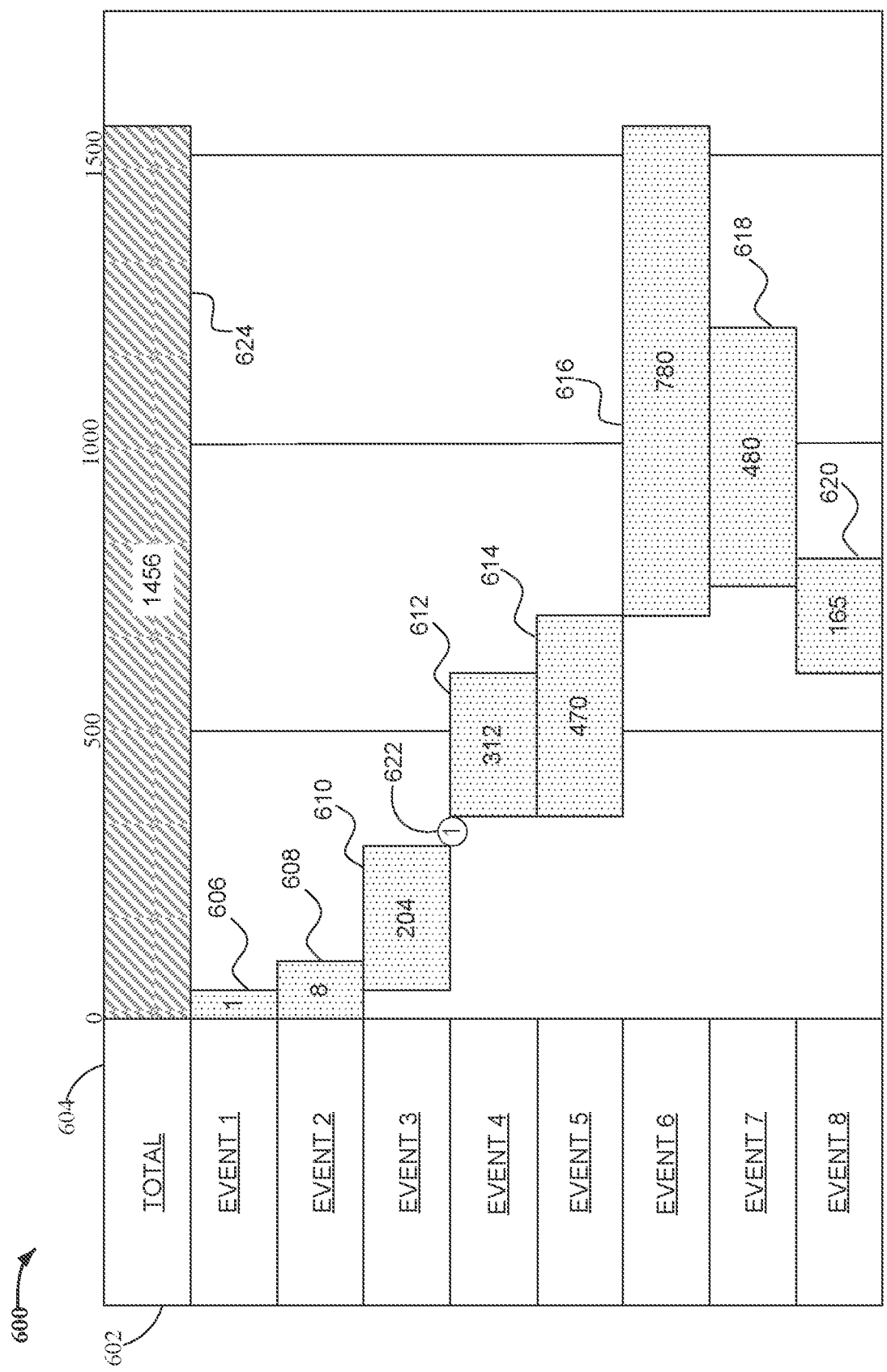
FIG. 6 shows an example visualization of a waterfall representation for analyzing computing processes and identifying inefficiencies in order to make corresponding adjustments to optimize the processes.

At operation 306, a waterfall representation 600 (a visualization of which is shown in FIG. 6) is generated (e.g., by waterfall module 210) based on the accessed event data. The waterfall module 210 can generate the waterfall representation 600 (e.g., a data structure) including data which can be visualized as an entry for each event 1-8 in the sequence of events along a first axis 602. The waterfall representation 600 also includes data which can be visualized as a second axis 604 that is orthogonal to the first axis 602. The start times and durations (e.g., in milliseconds "ms") of events 1-8, with entries along the first axis 602, are measured relative to the second axis 604 as blocks 606-620.

At operation 308, the process of analyzing the waterfall representation 600 begins. The analysis may be performed optimization module 214. The use of a waterfall representation 600 makes it possible to easily analyze a large amount of data and detect inefficient processing of events in the execution of application 122. The analysis is performed sequentially for each event 1-8 in the sequence along a first axis 602 of the waterfall representation 600.

At operation 310, the data analysis module 216 can identify each event in the sequence that has a start time that is later than a start time of an event which precedes it in the sequence. In the waterfall representation 600, events 3-8 have a start time (as indicated by blocks 610-620) that are later than the start times of events that precede them in the series of events. Events 1 and 2 both have a start time of 0 ms and therefore no event start time precedes their start time and for them the method ends. Accordingly only events 3-8 remain for analysis.

At operation 312, the data analysis module 216 can identify, based on the hierarchy of the events (e.g., from nesting of events in the event log), each event of events 3-8 that is a child of a parent event that precedes it in the sequence of events. In the example waterfall representation 600 only event 7 is a child event and its parent event 6 represents, for example, an activity of application 122 that has invoked the application activity represented by event 7. For example, event 6 could represent an activity that invokes a service (e.g., event 7) of application 122. Therefore the method ends for event 7 and only events 3-6 and 8 now remain.

At operation 314, the data analysis module 216 can identify, based on the dependency data for the events, each event of events 3-6 and 8 that has a start time that is dependent on a prior completion of at least one event that precedes it in the sequence. In the example waterfall representation 600, based on the dependency data, the start time for event 3 depends on the completion of event 1, the start time for event 4 depends on the completion of event 2 and the start time for event 6 depends on the completion of events 2 and 3. The start times for events 5 and 8 do not depend on the completion of any of the events that precede them in the sequence of events.

Based on the data analysis module 216 determining that start times for events 3, 4 and 6 do depend on the completion of at least one prior event, at operation 316, the method continues to operation 402 of method 400 described below for these events. Based on the data analysis module 216 determining that start times for events 5 and 8 do not depend on the completion of any prior event, at operation 318, the method continues to operation 502 of method 500 described below for events 5 and 8.

Figure 4:
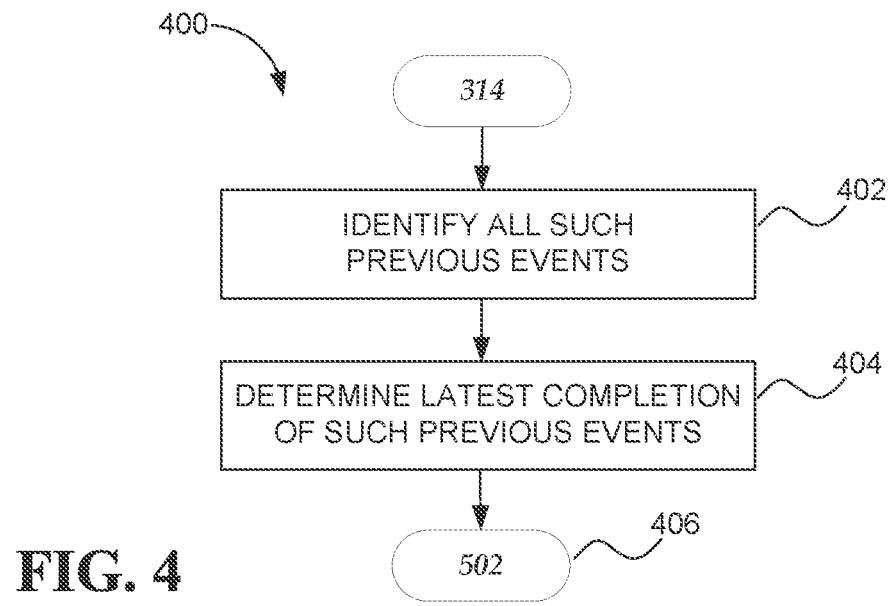
FIG. 4 shows a flow diagram illustrating one example embodiment of a method for using waterfall representations to analyze computing processes and identify inefficiencies in order to make corresponding adjustments to optimize the processes.

FIG. 4 shows a flow diagram illustrating one example embodiment of a method 400 for using waterfall representations to analyze computing processes and identify inefficiencies in order to make corresponding adjustments to optimize the processes. The operation of method 400 will be described with respect to the elements of FIGS. 1 and 2, and with respect to FIG. 6, which shows an example visualization of a waterfall representation 600 for analyzing computing processes and identifying inefficiencies in order to make corresponding adjustments to optimize the processes.

At operation 402, which follows from operation 314 of method 300, the data analysis module 216 identifies all events upon which the start times of events 3, 4 and 6 depend. In the example visualization of waterfall representation 600 and based on the dependency data, that the start time for event 3 depends only on the completion of event 1, the start time for event 4 depends only on the completion of event 2 and the start time for event 6 depends on the completion of events 2 and 3.

At operation 404, the start time module 218 identifies a latest completion time of the preceding events upon which the start times of events 3, 4 and 6 are dependent. In the example waterfall representation 600, these latest times will be 1 ms (e.g., completion of event 1) for event 3, 8 ms for event 4 (e.g., completion of event 2), and 205 ms for event 6 (e.g., completion of event 3). As noted above, the latest completion time is selected because this will ensure that the modified start time for represented events 3, 4 and 6 do not precede the completion of any other event that must finish (e.g., provide an output) before the event can begin (e.g., accept prior output as input).

At operation 406, the method continues to operation 502 of method 500 described below for events 3, 4 and 6.

Figure 5:
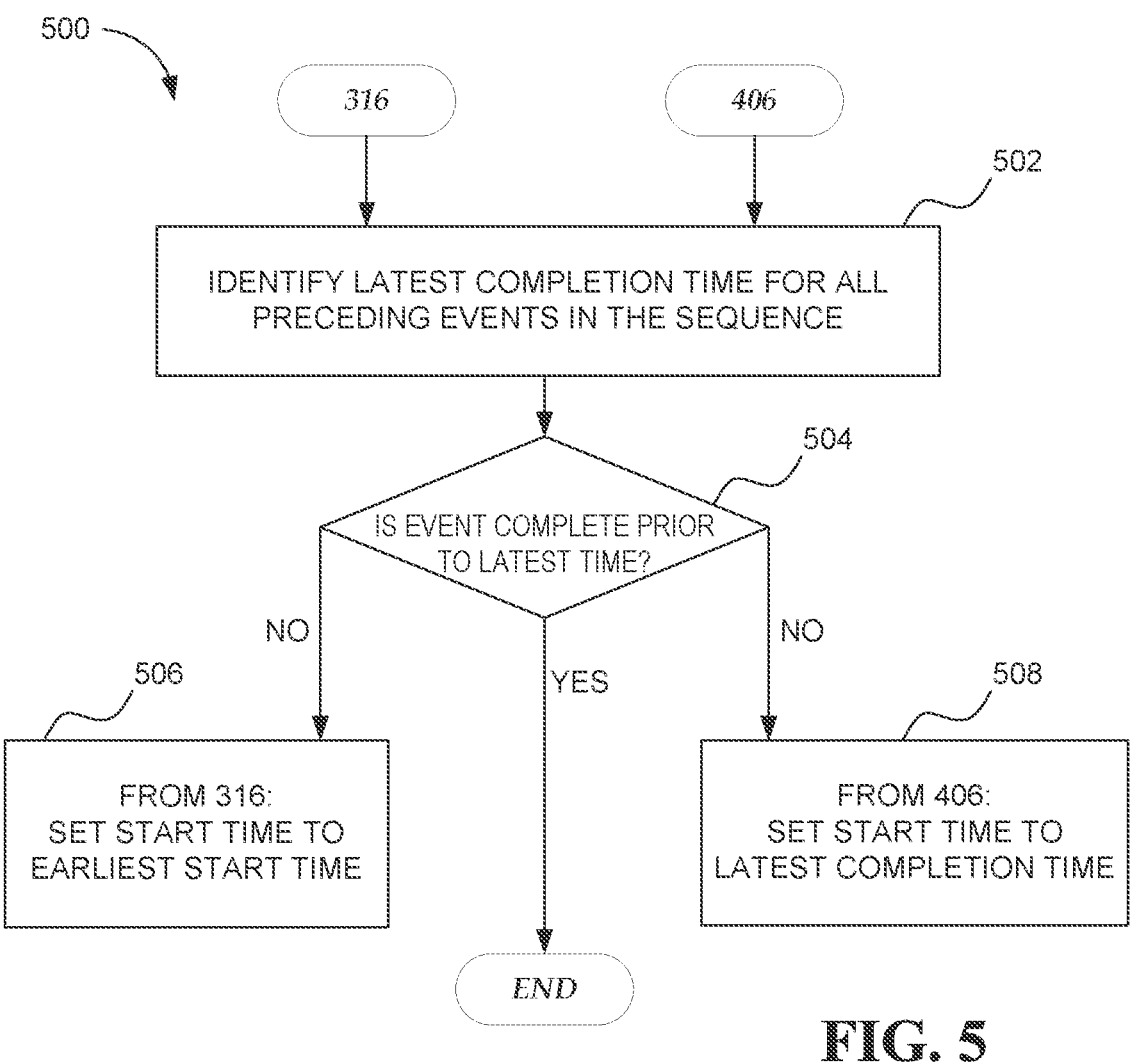
FIG. 5 shows a flow diagram illustrating one example embodiment of a method for using waterfall representations to analyze computing processes and identify inefficiencies in order to make corresponding adjustments to optimize the processes.

FIG. 5 shows a flow diagram illustrating one example embodiment of a method 500 for using waterfall representations to analyze computing processes and identify inefficiencies in order to make corresponding adjustments to optimize the processes. The operation of method 500 will be described with respect to the elements of FIGS. 1 and 2, and with respect to FIGS. 6 and 7, which show example visualizations of waterfall representations 600 and 700 for analyzing computing processes, before and after identifying inefficiencies and making corresponding adjustments to optimize the processes.

At operation 502, which follows from operation 314 of method 300 and from operation 406 of method 400, the start time module 218 identifies, for each event in the sequence still being analyzed, a latest completion time of all of the events that precede it in the sequence of events. For event 3, from operation 406 of method 400, it is 8 ms, e.g., the completion time of event 2.

At operation 504, the start time module 218 determines if the start time (1 ms) and duration (204 ms) of event 3 (block 610) indicate that it will already be completed prior to the identified latest completion time of all the events that precede it in the sequence (e.g., 8 ms as noted above) to know if advancing the start time of the event will help reduce the overall processing time of all of the events in the sequence. In the case of event 3 a completion time of 205 ms indicates that event 3 will not be completed prior to the 8 ms completion time of event 2 and therefore advancing the start time of event 3 would be helpful.

At operation 508, based on the completion time of 205 ms indicating that event 3 will not be completed prior to the 8 ms completion time of event 2, the start time module 218 sets the start time for event 3 (in the waterfall representation 700) to a latest completion time of the at least one preceding event upon which the start time of event 3 is dependent (e.g., event 1 with a 1 ms completion time). In the case of event 3 it is already set to start at the completion time of event 1 (e.g., at 1 ms) and therefore no change of start time is required.

At operation 502, which follows from operation 406 of method 400 for event 4, the start time module 218 identifies, for each event in the sequence still being analyzed, a latest completion time of all of the events that precede it in the sequence of events. For event 4 it is 205 ms, e.g., the completion time of event 3.

At operation 504, the start time module 218 determines if the start time (206 ms) and duration (312 ms) of event 4 (block 612) indicate that it will already be completed prior to the identified latest completion time of all the events that precede it in the sequence (e.g., 205 ms as noted above) to know if advancing the start time of the event will help reduce the overall processing time of all of the events in the sequence. In the case of event 4 a completion time of 518 ms indicates that event 4 will not be completed prior to the 205 ms completion time of event 3 and therefore advancing the start time of event 4 would be helpful.

At operation 508, based on the completion time of 518 ms indicating that event 3 will not be completed prior to the 205 ms completion time of event 3, the start time module 218 sets the start time for event 4 (in the waterfall representation 700) to a latest completion time of the at least one preceding event upon which the start time of event 4 is dependent (e.g., event 2 with an 8 ms completion time). In the case of event 4, its start time is set to 8 ms with a duration of 312 ms indicating a completion time of 320 ms. As shown on the visualization of waterfall representation 700 the gap in event processing 622 with a start time at 205 ms and duration of 1 ms is eliminated by moving the start time of event 4 from 206 ms to 8 ms. A gap like 622 can form when application 122 is performing non-event activities such as garbage collecting, a form of automatic memory management for reclaiming memory occupied by objects that are no longer used by application 122.

At operation 502, which follows from operation 314 of method 300 in the case of event 5, the start time module 218 identifies, for event 5, a latest completion time of all of the events that precede it in the sequence of events. For event 5 it is 320 ms, e.g., the new completion time of event 4 after its start time was advanced to the completion time of event 2 as explained above.

At operation 504, the start time module 218 determines if the start time (206 ms) and duration (470 ms) of event 5 (block 614) indicate that it will already be completed prior to the identified latest completion time of all the events that precede it in the sequence (e.g., 320 ms as noted above) to know if advancing the start time of the event will help reduce the overall processing time of all of the events in the sequence. In the case of event 5 a completion time of 676 ms indicates that event 5 will not be completed prior to the 320 ms completion time of event 4 and therefore advancing the start time of event 5 would be helpful.

Figure 7:
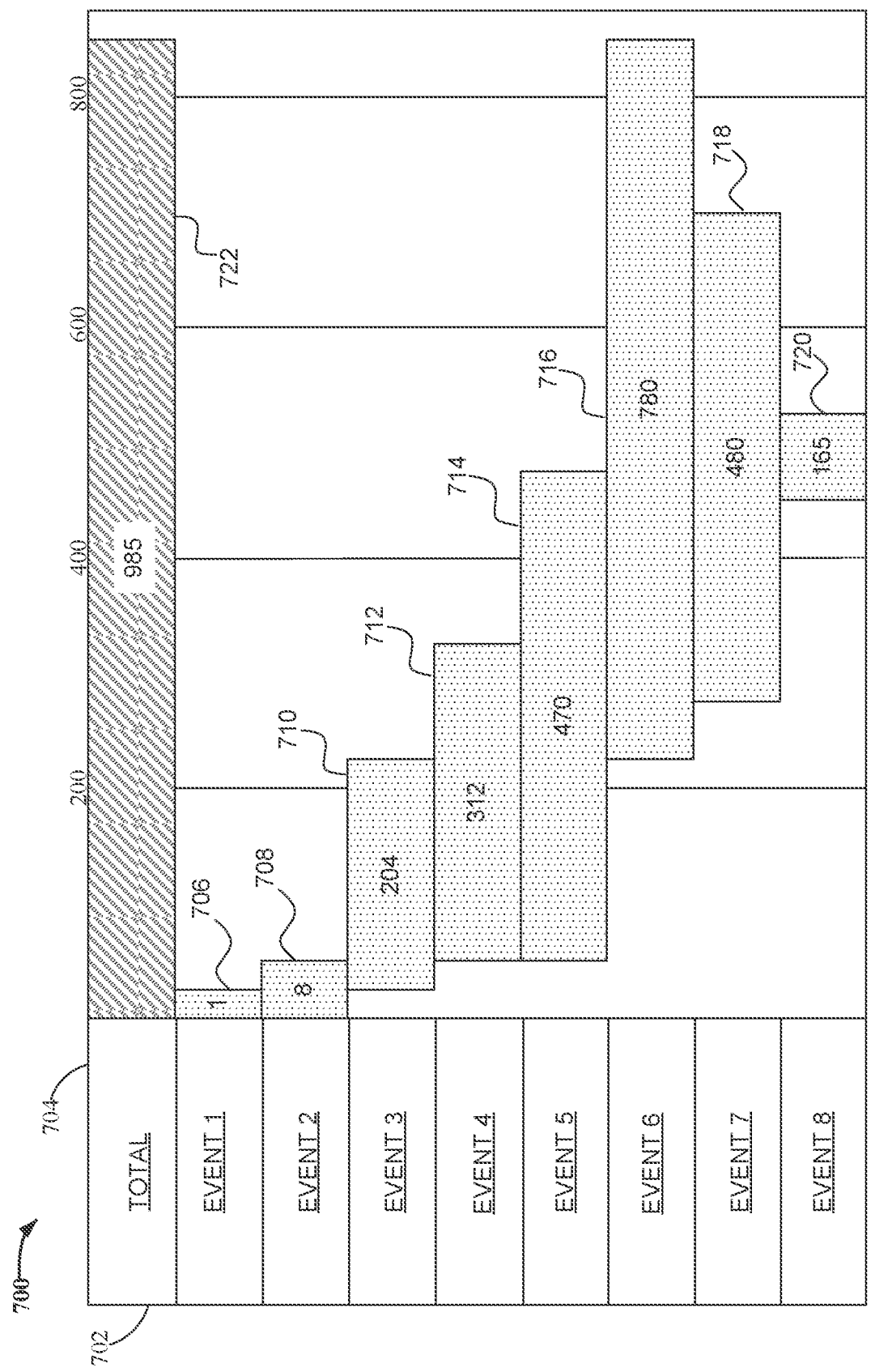
FIG. 7 shows an an example visualization of a waterfall representation for analyzing computing processes and identifying inefficiencies in order to make corresponding adjustments to optimize the processes.

At operation 506, based on the a completion time of 676 ms indicating that event 5 will not be completed prior to the 320 ms completion time of event 4, the start time module 218 sets the start time for event 5 (in the waterfall representation 700) to an earliest start time possible based on a determined available parallel processing capacity at the possible earlier start time. For example, the visualization of waterfall representation 700 of FIG. 7 shows the events 1-8 along a first axis 702 after the optimizing of start times which are reflected (together with respective durations) along second axis 704 of waterfall representation 700 by blocks 706-720. In waterfall representation 700 the start time of event 5 has been advanced to 8 ms like event 4 which with its duration of 470 ms indicates a completion time of 478 ms. The start time module 218 may determine the earliest start time possible for event 5 by identifying available processing cores at a server 118 hosting the application 122 at the earlier start time of 8 ms. Furthermore, if event 5 is a transaction event, the start time module 218 may determine the 8 ms start time for event 5 by identifying a maximum number of simultaneous connections per server 118 of the application 122.

At operation 502, which follows from operation 406 of method 400 for event 6, the start time module 218 identifies, for each event in the sequence still being analyzed, a latest completion time of all of the events that precede it in the sequence of events. For event 6 it is 478 ms, e.g., the completion time of event 5 after its start time was advanced to 8 ms as explained above.

At operation 504, the start time module 218 determines if the start time (676) and duration (780 ms) of event 6 (block 616) indicate that it will already be completed prior to the identified latest completion time of all the events that precede it in the sequence (e.g., 478 ms as noted above) to know if advancing the start time of the event will help reduce the overall processing time of all of the events in the sequence. In the case of event 6 a completion time of 1456 ms indicates that event 6 will not be completed prior to the 478 ms completion time of event 5 and therefore advancing the start time of event 6 would be helpful.

At operation 508, based on the a completion time of 1456 ms indicating that event 6 will not be completed prior to the 478 ms completion time of event 5, the start time module 218 sets the start time for event 6 (in the waterfall representation 700) to a latest completion time of preceding events 2 and 3 upon which the start time of event 6 is dependent (e.g., event 3 with an 205 ms completion time). In the case of event 6, its start time is set to 205 ms with a duration of 780 ms indicating a completion time of 985 ms. This could be the result of an analysis of waterfall representation 600 to determine that event 6 seems to wait for event 5 to be completed before starting, but that event 6 is not dependent on event 5 and therefore can have its start time advanced. As shown on the visualization of waterfall representation 700 the child event 7 of parent event 6 also has its start time advanced together with event 6 since it is invoked by event 6 during execution of event 6 by application 122.

At operation 502, which follows from operation 314 of method 300 in the case of event 8, the start time module 218 identifies, for event 8, a latest completion time of all of the events that precede it in the sequence of events. For event 8 it is 985 ms, e.g., the new completion time of event 6 after its start time was advanced to the completion time of event 3 as explained above.

At operation 504, the start time module 218 determines if the start time (518 ms) and duration (165 ms) of event 8 (block 620) indicate that it will already be completed prior to the identified latest completion time of all the events that precede it in the sequence (e.g., 985 ms as noted above) to know if advancing the start time of the event will help reduce the overall processing time of all of the events in the sequence. In the case of event 8 a completion time of 683 ms indicates that event 8 will be completed prior to the 985 ms completion time of event 6 and therefore advancing the start time of event 5 would not be helpful and the method ends.

The optimized parallel processing of events 1-8 from the execution of application 122 can be seen in the visualization of waterfall representation 700 of FIG. 7. In an embodiment, the waterfall representations 600 and 700 include, a special "Total" event entry at the top of the first axis 602 or 702 of the waterfall representation 600 or 700 respectively. The total event entry appears before the entry for the first event in the sequence, e.g., before the entry for event 1. The total event can help analyze the total time it takes to execute the sequence of events in the event log from application 122 so that modifications to event start times from waterfall representation 600 can be tested to see if they are reducing the overall processing time as determined in waterfall representation 700. In the examples of waterfall representations 600 and 700 it is clear from the respective completion times 1456 and 985 (blocks 624 and 722 respectively) of the total events that the optimization of parallel processing has greatly reduced the overall processing time for the of events 1-8.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application programming interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 1-7 are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the subject matter in different contexts from the disclosure contained herein.

Software Architecture

Figure 8:
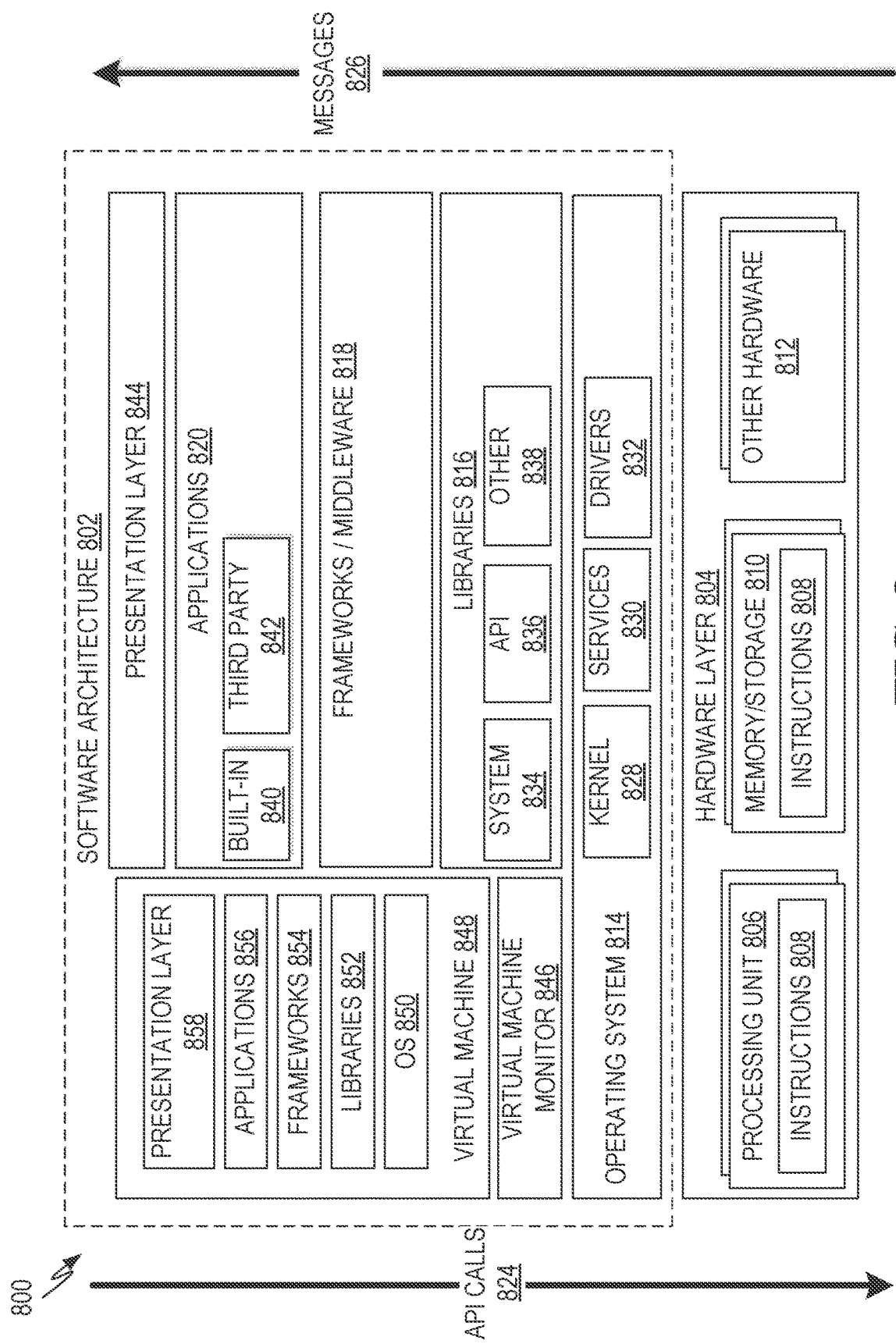
FIG. 8 is a block diagram illustrating an example of a software architecture that may be installed on a machine, according to some example embodiments.

FIG. 8 is a block diagram illustrating an example of a software architecture that may be installed on a machine, according to some example embodiments. FIG. 8 is merely a non-limiting example of a software architecture, and it will be appreciated that many other architectures may be implemented to facilitate the functionality described herein. The software architecture 802 may be executing on hardware such as a machine 900 of FIG. 9 that includes, among other things, processors 910, memory 930, and I/O components 950. A representative hardware layer 804 is illustrated and can represent, for example, the machine 900 of FIG. 9. The representative hardware layer 804 comprises one or more processing units 806 having associated executable instructions 808. The executable instructions 808 represent the executable instructions of the software architecture 802, including implementation of the methods, modules, and so forth of FIGS. 1-7. The hardware layer 804 also includes memory or storage modules 810, which also have the executable instructions 808. The hardware layer 804 may also comprise other hardware 812, which represents any other hardware of the hardware layer 804, such as the other hardware illustrated as part of the machine 900.

In the example architecture of FIG. 8, the software architecture 802 may be conceptualized as a stack of layers, where each layer provides particular functionality. For example, the software architecture 802 may include layers such as an operating system 814, libraries 816, frameworks/middleware 818, applications 820, and a presentation layer 844. Operationally, the applications 820 or other components within the layers may invoke API calls 824 through the software stack and receive a response, returned values, and so forth (illustrated as messages 826) in response to the API calls 824. The layers illustrated are representative in nature, and not all software architectures have all layers. For example, some mobile or special purpose operating systems may not provide a frameworks/middleware 818 layer, while others may provide such a layer. Other software architectures may include additional or different layers.

The operating system 814 may manage hardware resources and provide common services. The operating system 814 may include, for example, a kernel 828, services 830, and drivers 832. The kernel 828 may act as an abstraction layer between the hardware and the other software layers. For example, the kernel 828 may be responsible for memory management, processor management (e.g., scheduling), component management, networking, security settings, and so on. The services 830 may provide other common services for the other software layers. The drivers 832 may be responsible for controlling or interfacing with the underlying hardware. For instance, the drivers 832 may include display drivers, camera drivers, Bluetooth® drivers, flash memory drivers, serial communication drivers (e.g., Universal Serial Bus (USB) drivers), WiFi® drivers, audio drivers, power management drivers, and so forth depending on the hardware configuration.

The libraries 816 may provide a common infrastructure that may be utilized by the applications 820 and/or other components and/or layers. The libraries 816 typically provide functionality that allows other software modules to perform tasks in an easier fashion than by interfacing directly with the underlying operating system 814 functionality (e.g., kernel 828, services 830, or drivers 832). The libraries 816 may include system 834 libraries (e.g., C standard library) that may provide functions such as memory allocation functions, string manipulation functions, mathematic functions, and the like. In addition, the libraries 816 may include API 836 libraries such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 816 may also include a wide variety of other libraries 838 to provide many other APIs to the applications 820 and other software components/modules.

The frameworks 818 (also sometimes referred to as middleware) may provide a higher-level common infrastructure that may be utilized by the applications 820 or other software components/modules. For example, the frameworks 818 may provide various graphic user interface (GUI) functions, high-level resource management, high-level location services, and so forth. The frameworks 818 may provide a broad spectrum of other APIs that may be utilized by the applications 820 and/or other software components/modules, some of which may be specific to a particular operating system or platform.

The applications 820 include built-in applications 840 and/or third party applications 842. Examples of representative built-in applications 840 may include, but are not limited to, a contacts application, a browser application, a book reader application, a location application, a media application, a messaging application, or a game application. The third party applications 842 may include any of the built-in applications, as well as a broad assortment of other applications. In a specific example, the third party application 842 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 842 may invoke the API calls 824 provided by the mobile operating system such as the operating system 814 to facilitate functionality described herein.

The applications 820 may utilize built-in operating system functions (e.g., kernel 828, services 830, or drivers 832), libraries (e.g., system 834, APIs 836, and other libraries 838), or frameworks/middleware 818 to create user interfaces to interact with users of the system. Alternatively, or additionally, in some systems, interactions with a user may occur through a presentation layer, such as the presentation layer 844. In these systems, the application/module "logic" can be separated from the aspects of the application/module that interact with the user.

Some software architectures utilize virtual machines. In the example of FIG. 8, this is illustrated by a virtual machine 848. A virtual machine creates a software environment where applications/modules can execute as if they were executing on a hardware machine e.g., the machine 900 of FIG. 9, for example). A virtual machine is hosted by a host operating system (e.g., operating system 814) and typically, although not always, has a virtual machine monitor 846, which manages the operation of the virtual machine as well as the interface with the host operating system (e.g., operating system 814). A software architecture executes within the virtual machine 848, such as an operating system 850, libraries 852, frameworks/middleware 854, applications 856, or a presentation layer 858. These layers of software architecture executing within the virtual machine 848 can be the same as corresponding layers previously described or may be different.

Machine Architecture and Machine-Readable Medium

Figure 9:
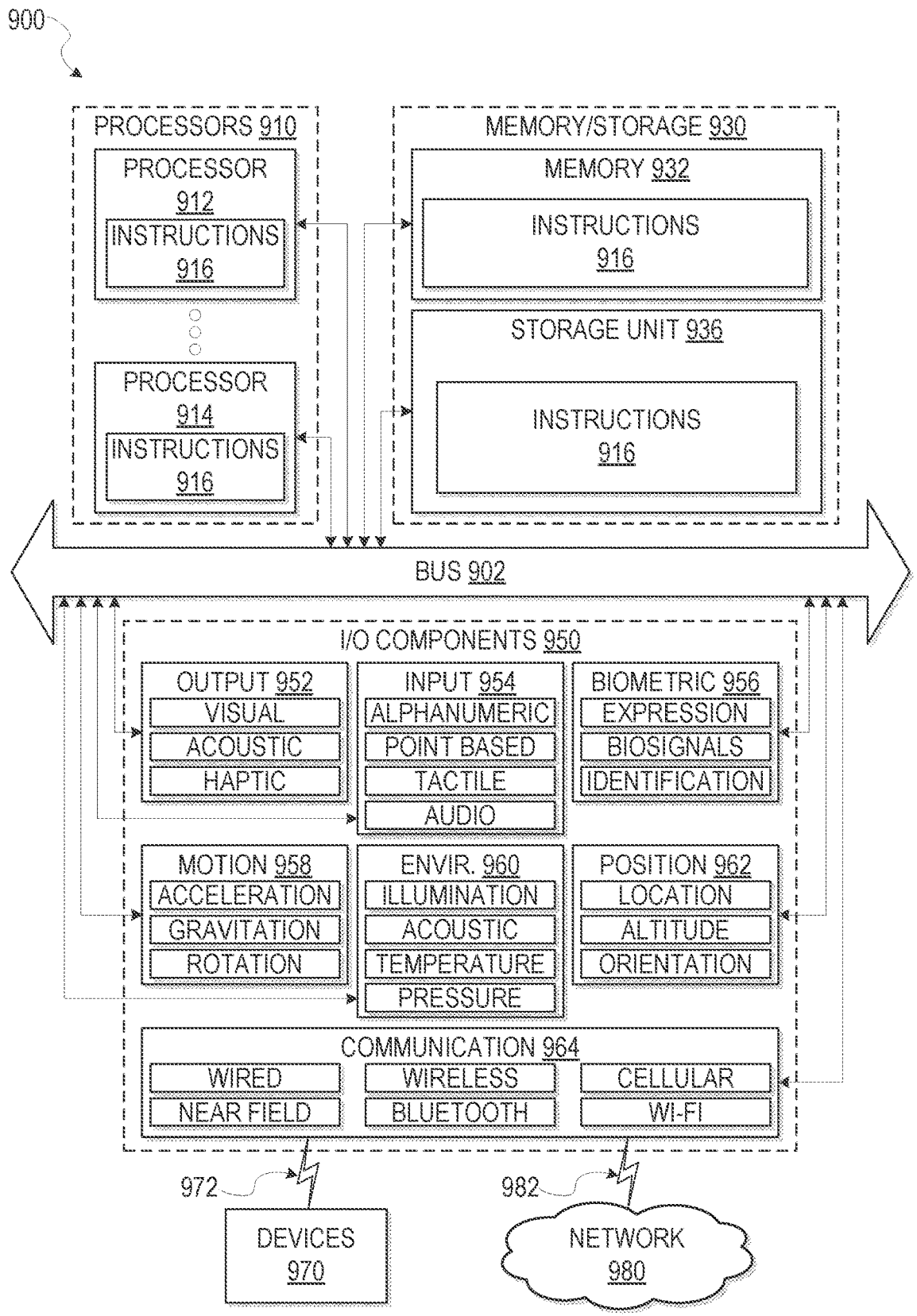
FIG. 9 illustrates a diagrammatic representation of a machine in the form of a computer system within which a set of instructions may be executed for causing the machine to perform any one or more of the methodologies discussed herein.

FIG. 9 illustrates a diagrammatic representation of a machine in the form of a computer system within which a set of instructions may be executed for causing the machine to perform any one or more of the methodologies discussed herein. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example the instructions 916 may cause the machine 900 to execute the method 700 of FIG. 7. Additionally, or alternatively, the instructions 916 may implement FIGS. 1-7, and so forth. The instructions 916 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with each other such as via a bus 902. In an example embodiment, the processors 910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 912 and a processor 914 that may execute the instructions 916. The term "processor" is intended to include multi-core processors that may comprise two or more independent processors (sometimes referred to as "cores") that may execute instructions contemporaneously. Although FIG. 9 shows multiple processors, the machine 900 may include a single processor with a single core, a single processor with multiple cores (e.g., a multi-core processor), multiple processors with a single core, multiple processors with multiples cores, or any combination thereof.

The memory/storage 930 may include a memory 932, such as a main memory, or other memory storage, and a storage unit 936, both accessible to the processors 910 such as via the bus 902. The storage unit 936 and the memory 932 store the instructions 916 embodying any one or more of the methodologies or functions described herein. The instructions 916 may also reside, completely or partially, within the memory 932, within the storage unit 936, within at least one of the processors 910 (e.g., within the processor's cache memory), or any suitable combination thereof, during execution thereof by the machine 900. Accordingly, the memory 932, the storage unit 936, and the memory of the processors 910 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), or any suitable combination thereof. The term "machine-readable medium" should be taken to include a single medium or multiple media (e.g., a centralized or distributed database, or associated caches and servers) able to store the instructions 916. The term "machine-readable medium" shall also be taken to include any medium, or combination of multiple media, that is capable of storing instructions (e.g., instructions 916) for execution by a machine (e.g., machine 900), such that the instructions, when executed by one or more processors of the machine (e.g., processors 910), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 950 may include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962, among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 962 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 970 may be another machine or any of a wide variety of peripheral devices (e.g., a peripheral device coupled via a USB).

Moreover, the communication components 964 may detect identifiers or include components operable to detect identifiers. For example, the communication components 964 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 980 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., hypertext transfer protocol (HTTP)). Similarly, the instructions 916 may be transmitted or received using a transmission medium via the coupling 972 (e.g., a peer-to-peer coupling) to the devices 970. The term "transmission medium" shall be taken to include any intangible medium that is capable of storing, encoding, or carrying the instructions 916 for execution by the machine 900, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The invention claimed is:

1. A computer-implemented method comprising:
accessing event data associated with an application, the event data indicating a sequence of events and start times for individual events within the sequence of events;

displaying, based on the event data, a representation in a user interface, the displayed representation comprising a first axis, a second axis that is orthogonal to the first axis, and individual entries for the individual events within the sequence of events along the first axis with start times measured relative to the second axis; and adjusting at least one of the displayed individual entries for a respective event by moving the displayed individual entry to a different position along the second axis associated with a different start time, wherein the displayed individual entry is automatically moved to the different position based on the respective event being dependent on at least one different respective event in the sequence of events.

2. The method of claim 1, wherein the displayed representation comprises a waterfall representation.

3. The computer-implemented method of claim 1, wherein the displayed individual entry is moved based on the respective event being a child of at least one different respective event in the sequence of events.

4. The computer-implemented method of claim 1, wherein displayed individual entry is moved to a different position along the second axis associated with an earlier start time.

5. The computer-implemented method of claim 1, wherein displayed individual entry is moved to a different position along the second axis associated with a later start time.

6. The computer-implemented method of claim 1, wherein each of the individual entries for the individual events within the sequence of events represent a duration of the respective individual event.

7. The computer-implemented method of claim 1, further comprising displaying, in the user interface, a total time for the sequence of events.

8. One or more computer-readable storage devices comprising instructions that, responsive to execution by one or more processors, perform operations comprising:

accessing event data associated with an application, the event data indicating a sequence of events and start times for individual events within the sequence of events;

displaying, based on the event data, a representation in a user interface, the displayed representation comprising a first axis, a second axis that is orthogonal to the first axis, and individual entries for the individual events within the sequence of events along the first axis with start times measured relative to the second axis; and adjusting at least one of the displayed individual entries for a respective event by moving the displayed individual entry to a different position along the second axis associated with a different start time, wherein the displayed individual entry is automatically moved to the different position based on the respective event being dependent on at least one different respective event in the sequence of events.

9. The one or more computer-readable storage devices of claim 8, wherein the displayed representation comprises a waterfall representation.

10. The one or more computer-readable storage devices of claim 8, wherein the displayed individual entry is moved based on the respective event being a child of at least one different respective event in the sequence of events.

11. The one or more computer-readable storage devices of claim 8, wherein displayed individual entry is moved to a different position along the second axis associated with an earlier start time.

12. The one or more computer-readable storage devices of claim 8, wherein displayed individual entry is moved to a different position along the second axis associated with a later start time.

13. The one or more computer-readable storage devices of claim 8, wherein each of the individual entries for the individual events within the sequence of events represent a duration of the respective individual event.

14. The one or more computer-readable storage devices of claim 8, further comprising displaying, in the user interface, a total time for the sequence of events.

15. A computing device comprising:

at least a memory and a processor to perform operations comprising:

accessing event data associated with an application, the event data indicating a sequence of events and start times for individual events within the sequence of events;

displaying, based on the event data, a representation in a user interface, the displayed representation comprising a first axis, a second axis that is orthogonal to the first axis, and individual entries for the individual events within the sequence of events along the first axis with start times measured relative to the second axis; and adjusting at least one of the displayed individual entries for a respective event by moving the displayed individual entry to a different position along the second axis associated with a different start time, wherein the displayed individual entry is automatically moved to the different position based on the respective event being dependent on at least one different respective event in the sequence of events.

16. The computing device of claim 15, wherein displayed individual entry is moved to a different position along the second axis associated with an earlier start time.

17. The computing device of claim 15, wherein displayed individual entry is moved to a different position along the second axis associated with a later start time.

18. The computing device of claim 15, wherein the displayed representation comprises a waterfall representation.

19. The computing device of claim 15, wherein the displayed individual entry is moved based on the respective event being a child of at least one different respective event in the sequence of events.

20. The computing device of claim 15, wherein each of the individual entries for the individual events within the sequence of events represent a duration of the respective individual event.

* * * * *